E. M. RICHARDS.
FLUID PRESSURE BRAKE.
APPLICATION FILED JULY 23, 1920.
1,424,033.
Patented July 25, 1922.
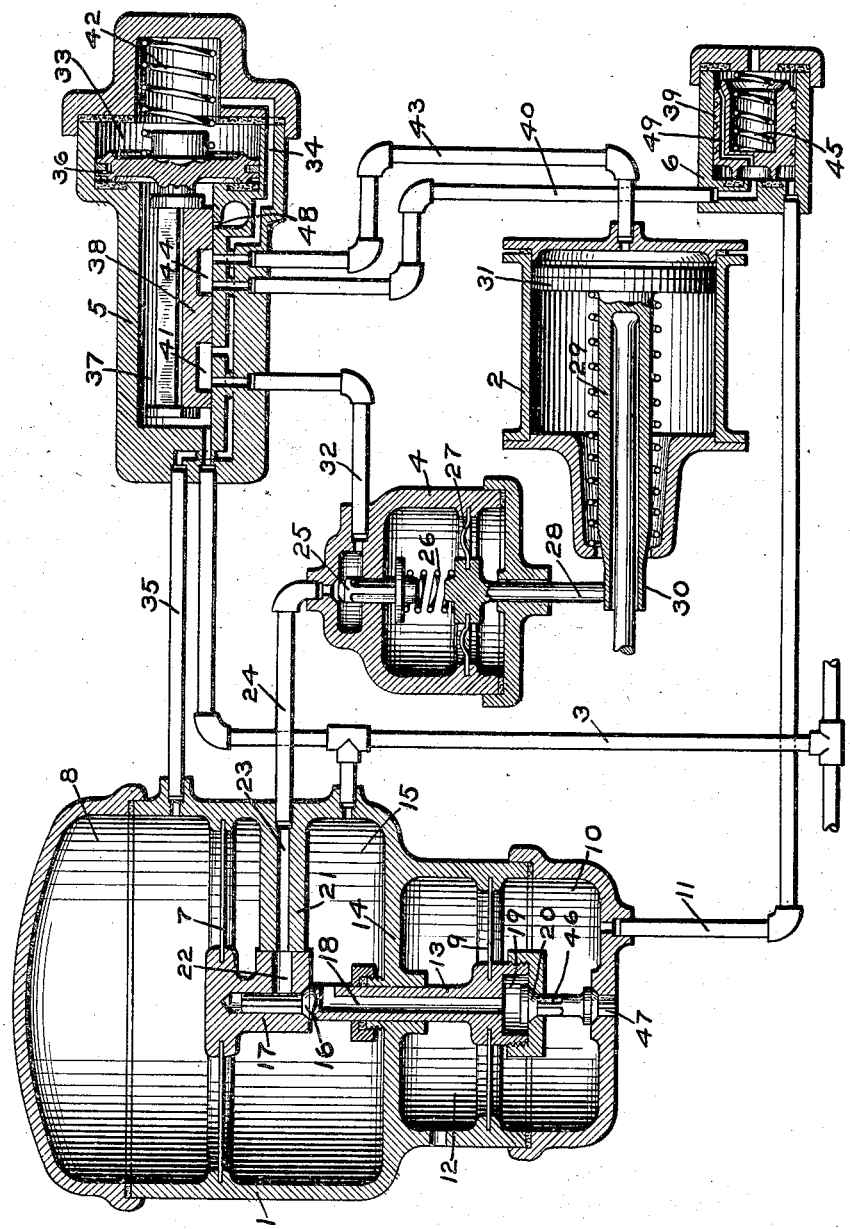
INVENTOR
Earl M. Richards
by *Wm. M. Cady*
Att'y.

UNITED STATES PATENT OFFICE.

EARL M. RICHARDS, OF WILKINSBURG, PENNSYLVANIA.

FLUID-PRESSURE BRAKE.

1,424,033. Specification of Letters Patent. Patented July 25, 1922.

Application filed July 23, 1920. Serial No. 398,436.

*To all whom it may concern:*

Be it known that I, EARL M. RICHARDS, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a brake equipment for railway cars.

It has heretofore been proposed to provide a brake equipment having means operated according to the pressures in the brake pipe, a chamber adapted to be charged from the brake pipe, and the brake cylinder, for controlling the brakes and in which fluid for applying the brakes may be supplied, in some cases, although not necessarily, from the brake pipe.

In releasing the brakes with an equipment of the above character, if the brake pipe pressure be restored to the normal pressure only at the head end of the train, then the brakes will not be entirely released, particularly toward the rear of the train, because the rate of reduction of pressure from the brake cylinder, due to brake cylinder leakage alone, tends to exceed that which should obtain from the rate of rise in brake pipe pressure.

Furthermore, even if there be no leakage from the brake cylinder, the rate of change in pressure in the brake pipe especially toward the rear of the train is so slow that the corresponding rate of release of fluid from the brake cylinder will be too slow to meet the desired requirements of train operation.

This situation may be remedied by initiating an overcharge of the brake pipe at the head end of the train, so that the pressure toward the rear of the train can be made to rise to a sufficient degree of pressure to ensure the complete release of the brakes and also at a more rapid rate throughout the train to secure the desired rapid release of the brakes.

If, however, this method of releasing the brakes by overcharging the brake pipe be employed, then a new difficulty arises in that the reservoirs will be overcharged from the brake pipe at the head end of the train and as far back as the overcharge in brake pipe pressure may extend, with the result that when the brake pipe pressure is again restored to the normal pressure, the higher pressure in the reservoirs, due to the overcharging, will operate to reapply the brakes.

One object of my invention is to provide means for overcoming the above difficulties.

Another object of my invention is to provide means in an equipment of the above character for retarding the release of the brakes.

Other objects and advantages will appear in the following more detailed description of the invention.

In the accompanying drawing, the single figure is a diagrammatic view, with the principal parts in section, of a car brake equipment embodying my invention.

As shown in the drawing, the equipment may comprise a main brake controlling valve device 1, a brake cylinder 2, a brake pipe 3, a valve device 4 for cutting off communication from the brake pipe to the reservoir chamber when the brakes are applied, a valve device 5 for controlling the recharge of the reservoir chamber and a retaining valve device 6.

The brake controlling valve device 1 may comprise a casing containing a movable diaphragm 7, subject on one side to the pressure in a reservoir chamber 8 and on the other side to the pressure in chamber 15, which is connected to brake pipe 3, and containing a movable diaphragm 9 of less area than the diaphragm 7 and subject on one side to the pressure in a chamber 10 which is supplied with fluid from the brake cylinder 2 through a pipe 11, and on the opposite side to atmospheric pressure which is constantly present in chamber 12.

Secured to diaphragm 9 is a stem 13, which extends through a partition wall 14, separating the chamber 12 from the chamber 15, and is provided at the outer end with a valve 16, the seat 17 of which is movable with the diaphragm 7.

The stem 13 is provided with a passage 18 which opens into chamber 15 at one end and into a valve chamber 19 at the other end, and contains a valve 20 having a stem 46 carrying at the end a release valve 47 for controlling an exhaust port from chamber 10 to the atmosphere.

The valve 16 controls the supply of fluid from the brake pipe to the reservoir chamber 8, the seat member 17 having a sliding valve connection with a member 21 projecting from the casing, so as to maintain communication from valve passage 22 to a passage 23 and pipe 24 leading to the valve device 4, regardless of movement of the diaphragm 7.

The valve device 4 comprises a casing containing a valve 25 for controlling communication from a pipe 24 to a pipe 32, which is connected to the valve device 5.

The valve 25 is subject to the pressure of a coil spring 26, the pressure of which is varied according to the movement of a diaphragm 27 and attached stem 28. For operating the stem 28, the piston stem 29 of the brake cylinder 2 is provided with a reduced portion 30 upon which the stem rests when the brake cylinder piston 31 is in release position, but upon movement of the brake cylinder piston to apply the brakes, the stem 28 rides up on the large diameter of the piston stem and thereby moves the diaphragm 27 so as to compress the spring 26.

The valve device 5 comprises a casing having a piston chamber 33 connected by passage 34 and pipe 35 to reservoir chamber 8 and containing a piston 36 and having a valve chamber 37 connected to the brake pipe 3 and containing a slide valve 38 adapted to be operated by piston 36.

The retaining valve device 6 may comprise a casing containing a spring weighted valve piston 39, for controlling communication from supply pipe 11 to pipe 40 which leads to the seat of slide valve 38.

In operation, fluid supplied to the brake pipe 3 flows to chamber 15 and acts on diaphragm 7, lifting the seat member 17, so that fluid is supplied from the brake pipe through passages 22 and 23 and pipe 24 to valve device 4. The brake cylinder piston 31 being in release position, the stem 28 is in the position shown in the drawing and the valve 25 is consequently relieved of the pressure of spring 26, so that said valve will be open at this time.

Fluid therefore flows past valve 25 to pipe 32 and thence through a cavity 41 in slide valve 38 to passage 34, charging the reservoir chamber 8 with fluid at brake pipe pressure and also the piston chamber 33 of the valve device 5. Since the brake pipe 3 is connected to the valve chamber 37, the fluid pressures on opposite sides of the piston 36 are equalized, permitting the spring 42 to maintain the piston 36 in the normal position shown in the drawing.

In this position, the brake cylinder pipe 43 is connected by cavity 44 in slide valve 38 with pipe 40.

If it is desired to apply the brakes, the brake pipe pressure is reduced and the higher reservoir pressure in chamber 8 then shifts the diaphragm 7 and the stem 13, so that the seat of the valve 20 is moved away from the valve.

Fluid under pressure can then flow from the brake pipe 3. through chamber 15, and passage 18, past the valve 20 to chamber 10 and thence through pipe 11 to the retaining valve device 6. The valve piston 39 is then shifted from its normal seat, so that fluid can flow from pipe 11 to pipe 40 and thence through cavity 44 in slide valve 38 to pipe 43 and the brake cylinder.

When the brakes are applied, the brake cylinder piston stem 29 acts on the stem 28 so as to compress spring 26 and thus cause the valve 25 to close.

If while the brakes are applied, fluid under pressure should leak from the brake cylinder, the equilibrium of pressures on the diaphragms 7 and 9 would be destroyed and the valve 20 would be unseated so as to supply sufficient fluid from the brake pipe to the brake cylinder until the balance of pressures on the diaphragms is again restored.

If it is desired to effect the release of the brakes, the brake pipe pressure may be increased above normal at the head end of the train in order to ensure the desired rapid rate of increase in brake pipe pressure throughout the train and to cause a rise in brake pipe pressure to a sufficient degree to ensure the complete release of the brakes throughout the train.

As the brake pipe pressure is increased, the initial effect is to cause the diaphragms 7 and 9 to move upwardly, since the equilibrium of pressures is destroyed, and thus the release valve 47 is opened to release fluid from the brake cylinder through pipe 40, cavity 44 in slide valve 38, pipe 43, and past the valve piston 39, which is now held open by brake cylinder pressure, to pipe 11 and chamber 10.

At the head end of the train and at other points where the brake pipe pressure may be increased above normal, the increase in pressure above normal will exceed the reservoir pressure in chamber 8, so that the seat 17 will be lifted from valve 16, permitting fluid from the brake pipe to flow into pipe 24, but if the brakes are applied, the valve 25 will be held closed and fluid cannot flow from the brake pipe to the reservoir chamber.

When the brake cylinder pressure has been reduced, by exhaust at the release valve 47, to a predetermined pressure, according to the pressure of spring 45, the valve piston 39 will move to its inner seat, cutting off the further release of fluid from the brake cylinder except that the restricted port 49 in the valve 39 is opened by the movement of same from its outer seat to permit a slow exhaust from the brake cylinder.

When the rise in brake pipe pressure above normal exceeds the reservoir chamber pressure by an amount sufficient to overcome the resistance of spring 42, the piston 36 will shift slide valve 38 so that brake cylinder pipe 43 is connected through cavity 44 with a restricted exhaust port 48, and at the same time communication is cut off between pipe 32 and passage 34.

A retarded release of the brakes at the head end of the train is thus effected while the recharge of the reservoir chamber is prevented.

When the brake pipe pressure is again reduced to normal, the spring 42 will move the piston 36 and slide valve 38 back to normal position, and by this time, the fluid in the brake cylinder will be released, so that valve 25 is allowed to open and thereby open communication through which the reservoir chamber is charged from the brake pipe.

The diaphragm 7 of the controlling valve device 1 being more sensitive to movement than the piston 36 and the slide valve 38, it will be evident that the valve 16 will be opened, when the brake pipe pressure is increased above normal, before the slide valve 38 is moved to cut off communication through which the reservoir chamber is charged from the brake pipe, and in order to prevent recharging of the reservoir chamber during the interval between the movement of the diaphragm 7 and the piston 36, means are provided for temporarily cutting off communication through the pipe 24.

For this purpose, the retaining valve device 6 is provided for temporarily retaining pressure in the brake cylinder 2, sufficient to hold the brake cylinder piston out in its applied position, so that the valve 25, controlling communication through pipe 24, will be held closed by the brake cylinder piston stem 29.

The fluid under pressure temporarily retained in the brake cylinder is then allowed to gradually escape through a restricted port 49, so that all the fluid remaining in the brake cylinder is finally exhausted to the atmosphere to fully release the brakes.

By means of the above described construction, the brake pipe pressure may be increased above normal to ensure the rapid and complete release of the brakes throughout the train without overcharging the reservoirs at any point in the train, thus obviating the possibility of a reapplication of the brakes upon a return of the brake pipe pressure to normal.

Since with my improvement, the brake pipe may be overcharged in releasing the brakes, without detrimental effect, the release of the brakes can be more quickly obtained, and this in turn permits the brakes to be graduated off more rapidly, and also ensures the full release of the brakes, as desired.

Having now described my invention, what I claim as new and desire to secure by Letters Patent, is:

1. In a fluid pressure brake, the combination with a brake pipe, of means subject to the opposing pressures of the brake pipe and a chamber normally charged with fluid from the brake pipe for controlling the brakes and means operated upon an increase in brake pipe pressure above normal for preventing the charging of said chamber from the brake pipe.

2. In a fluid pressure brake, the combination with a brake pipe, of means subject to the opposing pressures of the brake pipe and a chamber normally charged with fluid from the brake pipe for controlling the brakes and means operated upon an increase in brake pipe pressure above normal for closing communication through which said chamber is charged with fluid under pressure from the brake pipe.

3. In a fluid pressure brake, the combination with a brake pipe, of a movable abutment subject to the opposing pressures of the brake pipe and a reservoir chamber adapted to be normally charged with fluid at brake pipe pressure, valve means operated by said abutment for controlling the brakes, and means operated upon an increase in brake pipe pressure above normal for cutting off communication through which said reservoir chamber is charged from the brake pipe.

4. In a fluid pressure brake, the combination with a brake pipe, of a movable abutment subject to the opposing pressures of the brake pipe and a reservoir chamber adapted to be normally charged with fluid at brake pipe pressure, valve means operated by said abutment for controlling the brakes, and means operated by a predetermined increase in brake pipe pressure above normal for cutting off communication through which said reservoir chamber is charged from the brake pipe.

5. In a fluid pressure brake, the combination with a brake pipe, of means subject to the opposing pressures of the brake pipe and a chamber normally charged with fluid under pressure from the brake pipe for controlling the brakes and means operated when the brakes are applied for cutting off communication through which said chamber is charged from the brake pipe.

6. In a fluid pressure brake, the combination with a brake pipe and a brake cylinder containing a brake cylinder piston, of means subject to the opposing pressures of the brake pipe and a chamber normally charged with fluid under pressure from the brake pipe for controlling the brakes and means operated by the movement of the brake cylinder piston to apply the brakes for cutting off communication through which said chamber is charged from the brake pipe.

7. In a fluid pressure brake, the combination with a brake pipe, of means subject to the opposing pressures of the brake pipe and a chamber normally charged with fluid under pressure from the brake pipe for controlling the brakes, means operated upon applying the brakes for cutting off communication through which said chamber is charged from the brake pipe, and means operated upon an increase in brake pipe pressure above normal for also cutting off said communication.

8. In a fluid pressure brake, the combination with a brake pipe, a brake cylinder, and a valve mechanism governed by the pressures in the brake pipe, the brake cylinder, and a chamber normally charged from the brake pipe for controlling the brakes, of means operated upon an increase in brake pipe pressure above normal for cutting off communication through which said chamber is charged from the brake pipe.

9. In a fluid pressure brake, the combination with a brake pipe, a brake cylinder, and a valve mechanism governed by the pressures in the brake pipe, the brake cylinder, and a chamber normally charged from the brake pipe for controlling the brakes, of means operated upon an increase in brake pipe pressure above normal in releasing the brakes for cutting off communication through which said chamber is charged from the brake pipe.

10. In a fluid pressure brake, the combination with a brake pipe, brake cylinder, and valve mechanism subject to the opposing pressures of the brake pipe and a chamber normally charged with fluid under pressure from the brake pipe for controlling the application and release of the brakes, of means normally establishing communication through which fluid from the brake cylinder is released by said valve mechanism and operated upon an increase in brake pipe pressure above normal for cutting off said communication.

11. In a fluid pressure brake, the combination with a brake pipe, brake cylinder, and valve mechanism subject to the opposing pressures of the brake pipe and a chamber normally charged with fluid under pressure from the brake pipe for controlling the application and release of the brakes, of means normally establishing communication through which fluid from the brake cylinder is released by said valve mechanism and operated upon an increase in brake pipe pressure above normal for cutting off said communication and for opening another communication through which fluid is released from the brake cylinder.

12. In a fluid pressure brake, the combination with a brake pipe and means subject to the opposing pressures of the brake pipe and a chamber normally charged from the brake pipe for controlling the brakes, of means operating in releasing the brakes for preventing an increase in pressure in said chamber above normal.

13. In a fluid pressure brake, the combination with a brake pipe and means subject to the opposing pressures of the brake pipe and a chamber normally charged from the brake pipe for controlling the brakes, of means operating in releasing the brakes for preventing an increase in pressure in said chamber above normal when the brake pipe pressure is increased above normal.

14. In a fluid pressure brake, the combination with a brake pipe, brake cylinder, and a valve mechanism subject to the pressures in the brake pipe and brake cylinder for controlling the brakes, of means operated upon an increase in brake pipe pressure above normal for controlling the release of the brakes.

15. In a fluid pressure brake, the combination with a brake pipe and a valve mechanism subject to the opposing pressures of the brake pipe and a chamber normally charged from the brake pipe, of means operated upon applying the brakes for cutting off communication through which said chamber is charged from the brake pipe and valve means for retaining pressure in the brake cylinder.

16. In a fluid pressure brake, the combination with a brake pipe and a valve mechanism subject to the opposing pressures of the brake pipe and a chamber normally charged from the brake pipe, of means operated upon applying the brakes for cutting off communication through which said chamber is charged from the brake pipe and valve means for temporarily retaining pressure in the brake cylinder.

17. In a fluid pressure brake, the combination with a brake pipe and a valve mechanism subject to the opposing pressures of the brake pipe and a chamber normally charged from the brake pipe, of a valve device normally establishing communication through which said chamber is charged from the brake pipe and communication through which the brakes are released by operation of said valve mechanism and operated upon an increase in brake pipe pressure above normal for cutting off both communications.

18. In a fluid pressure brake, the combination with a brake pipe, of means subject to the opposing pressures of the brake pipe and a chamber normally charged with fluid from the brake pipe for controlling the brakes and means operated by a variation in brake pipe pressure for preventing the charging of said chamber above normal brake pipe pressure from the brake pipe.

In testimony whereof I have hereunto set my hand.

EARL M. RICHARDS.